(12) United States Patent
Li

(10) Patent No.: US 6,999,466 B2
(45) Date of Patent: Feb. 14, 2006

(54) SWITCHING CONCENTRATOR

(75) Inventor: Shuo-Yen Robert Li, Hong Kong (HK)

(73) Assignee: Industrial Technology Research Institute, Hsinchu (TW)

( * ) Notice: Subject to any disclaimer, the term of this patent is extended or adjusted under 35 U.S.C. 154(b) by 1127 days.

(21) Appl. No.: 09/882,439

(22) Filed: Jun. 15, 2001

(65) Prior Publication Data

US 2001/0055304 A1    Dec. 27, 2001

Related U.S. Application Data

(60) Provisional application No. 60/212,333, filed on Jun. 16, 2000.

(51) Int. Cl.
*H04J 3/17* (2006.01)
(52) U.S. Cl. .................. 370/434; 370/388; 710/316
(58) Field of Classification Search ............ 370/395.1, 370/434, 411, 388, 398, 355, 390, 369, 375, 370/380; 710/316
See application file for complete search history.

(56) References Cited

U.S. PATENT DOCUMENTS

| | | | |
|---|---|---|---|
| 4,523,273 A | 6/1985 | Adams et al. ............ 710/120 |
| 4,623,996 A | 11/1986 | McMillen ................ 370/418 |
| 4,852,091 A | 7/1989 | Li ........................... 370/462 |
| 4,899,334 A | 2/1990 | Shimizu .................. 370/411 |
| 4,905,225 A | 2/1990 | Francois et al. .......... 370/353 |
| 4,945,534 A | 7/1990 | Driscoll et al. ........... 370/260 |
| 4,955,017 A | 9/1990 | Eng et al. ................. 370/230 |
| 4,970,507 A | 11/1990 | Cooperman et al. ...... 340/2.21 |
| 5,123,011 A | 6/1992 | Hein et al. ................ 370/380 |
| 5,148,428 A | 9/1992 | Lee .......................... 370/411 |
| 5,166,926 A | 11/1992 | Cisneros et al. ......... 370/392 |
| 5,184,346 A | 2/1993 | Kozaki et al. ........... 370/395.7 |
| 5,216,668 A | 6/1993 | Zhang ..................... 370/411 |
| 5,299,317 A | 3/1994 | Chen et al. .............. 710/317 |
| 5,303,383 A | 4/1994 | Neches et al. ............ 712/43 |
| 5,353,283 A | 10/1994 | Tsuchiya .................. 370/392 |
| 5,367,518 A | 11/1994 | Newman .................. 370/414 |
| 5,367,520 A | 11/1994 | Cordell ................... 370/395.71 |
| 5,369,635 A | 11/1994 | Gandini et al. .......... 370/389 |
| 5,371,495 A | 12/1994 | Sturges et al. ........... 340/2.29 |
| 5,396,231 A | 3/1995 | Hein ....................... 340/2.22 |
| 5,426,733 A | 6/1995 | Masui ...................... 345/514 |
| 5,450,074 A | 9/1995 | Yoshifuji .................. 340/2.22 |
| 5,451,936 A | 9/1995 | Yang et al. ............... 340/2.22 |
| 5,471,628 A | 11/1995 | Phillips et al. ........... 712/223 |
| 5,483,541 A | 1/1996 | Linsky ..................... 714/701 |
| 5,500,858 A | 3/1996 | McKeown ................ 370/412 |
| 5,506,840 A | 4/1996 | Pauwels et al. .......... 370/397 |
| 5,517,495 A | 5/1996 | Lund et al. .............. 370/399 |
| 5,541,914 A | 7/1996 | Krishnamoorthy et al. . 370/427 |

(Continued)

OTHER PUBLICATIONS

The Knockout Switch: A Simple, Modular Architecture for High-Performance Packet Switching, IEEE Journal on Selected Areas in Comm., vol. SAC-5, No. 8, Oct. 1987, Yeh et al.

(Continued)

*Primary Examiner*—John Pezzlo
(74) *Attorney, Agent, or Firm*—Akin Gump Strauss Hauer & Feld, LLP

(57) ABSTRACT

An m-to-n concentrator constructed from smaller concentrator/sorters wherein m is not necessarily equal to 2n. For instance, the m-to-n concentrator can be implemented from an ⌊m/2⌋-to-n concentrator/sorter, an ⌈m12⌉-to-n concentrator/sorter, and n sorting cells to thereby produce the desired arrangement of outputs required of the m-to-n concentrator.

22 Claims, 9 Drawing Sheets

U.S. PATENT DOCUMENTS

| | | | |
|---|---|---|---|
| 5,566,179 A | 10/1996 | Kobayashi et al. | 370/396 |
| 5,568,477 A | 10/1996 | Galand et al. | 370/729 |
| 5,583,861 A | 12/1996 | Holden | 370/395.4 |
| 5,600,630 A | 2/1997 | Takano et al. | 370/218 |
| 5,602,844 A | 2/1997 | Lyles | 370/395.31 |
| 5,623,698 A | 4/1997 | Stephenson et al. | 710/38 |
| 5,671,222 A | 9/1997 | Chen et al. | 370/388 |
| 5,689,505 A | 11/1997 | Chiussi et al. | 370/388 |
| 5,689,506 A | 11/1997 | Chiussi et al. | 370/388 |
| 5,724,349 A | 3/1998 | Cloonan et al. | 370/390 |
| 5,724,351 A | 3/1998 | Chao et al. | 370/395.42 |
| 5,768,270 A | 6/1998 | Ha-Duong | 370/388 |
| 5,802,052 A | 9/1998 | Venkataraman | 370/395.72 |
| 5,809,021 A | 9/1998 | Diaz et al. | 370/364 |
| 5,841,775 A | 11/1998 | Huang | 370/422 |
| 5,852,407 A | 12/1998 | Ishii et al. | 340/2.21 |
| 5,859,846 A | 1/1999 | Kim et al. | 370/395.62 |
| 5,875,190 A * | 2/1999 | Law | 370/395.42 |
| 5,896,371 A | 4/1999 | Kobayashi et al. | 370/232 |
| 5,940,389 A | 8/1999 | Yang et al. | 370/380 |
| 5,949,778 A | 9/1999 | Abu-Amara et al. | 370/388 |
| 5,963,554 A | 10/1999 | Song | 370/395.1 |
| 5,987,028 A | 11/1999 | Yang et al. | 370/380 |
| 6,026,092 A * | 2/2000 | Abu-Amara et al. | 370/411 |
| 6,052,373 A | 4/2000 | Lau | 370/399 |
| 6,058,112 A | 5/2000 | Kerstein et al. | 370/389 |
| 6,067,298 A | 5/2000 | Shinohara | 370/395.71 |
| 6,081,512 A | 6/2000 | Muller et al. | 370/256 |
| 6,157,643 A | 12/2000 | Ma | 370/389 |
| 6,160,806 A | 12/2000 | Cantwell et al. | 370/360 |
| 6,215,786 B1 | 4/2001 | Larson et al. | 370/386 |
| 6,219,349 B1 | 4/2001 | Kobayashi et al. | 370/395.6 |
| 6,259,699 B1 | 7/2001 | Opalka et al. | 370/398 |
| 6,307,854 B1 | 10/2001 | Webb | 370/360 |
| 6,335,930 B1 | 1/2002 | Lee | 370/387 |
| 6,370,155 B1 | 4/2002 | Cantwell et al. | 370/465 |
| 6,400,708 B1 | 6/2002 | Bartholomew et al. | 370/352 |
| 6,427,037 B1 | 7/2002 | Okayama | 385/16 |
| 6,473,827 B1 | 10/2002 | McMillen et al. | 710/316 |
| 6,493,347 B1 | 12/2002 | Sindhu et al. | 370/401 |
| 6,553,031 B1 | 4/2003 | Nakamura et al. | 370/392 |
| 6,556,725 B1 | 4/2003 | Kondo et al. | 382/305 |
| 6,563,819 B1 | 5/2003 | Park | 370/388 |
| 6,563,837 B1 | 5/2003 | Krishna et al. | 370/413 |
| 6,600,741 B1 | 7/2003 | Chrin et al. | 370/35 |
| 6,611,519 B1 | 8/2003 | Howe | 370/386 |
| 6,621,828 B1 | 9/2003 | Field et al. | 370/466 |
| 6,628,651 B1 | 9/2003 | Ryan et al. | 370/369 |
| 6,647,017 B1 | 11/2003 | Heimann | 370/412 |
| 6,657,998 B1 | 12/2003 | Li | 370/360 |
| 6,714,562 B1 | 3/2004 | Calvignac et al. | 370/474 |
| 6,721,324 B1 | 4/2004 | Shinohara | 370/395.1 |
| 6,735,203 B1 | 5/2004 | Heiman | 370/394 |
| 6,747,971 B1 | 6/2004 | Hughes et al. | 370/387 |
| 6,757,281 B1 | 6/2004 | Irish | 370/389 |
| 6,757,282 B1 | 6/2004 | Ofek | 370/389 |
| 6,798,777 B1 | 9/2004 | Ferguson et al. | 370/392 |
| 6,829,237 B1 | 12/2004 | Carson et al. | 370/386 |
| 6,834,038 B1 | 12/2004 | Zelig et al. | 370/217 |
| 6,850,524 B1 | 2/2005 | Troxel et al. | 370/395.32 |
| 2002/0018475 A1 | 2/2002 | Ofek et al. | 370/400 |
| 2002/0031124 A1 | 3/2002 | Li | 370/390 |
| 2002/0176526 A1 | 11/2002 | Mejia | 375/372 |

OTHER PUBLICATIONS

Concentrators in ATM Switching, Comput Sys Sci & Eng (1996) 6: 335-342, vol. 11. No. 6, Nov. 1996, Li et al.

Fast Knockout Algorithm for Self-Route Concentration, Commptuer Communications 22 (1999) 1574-1584, Oct. 1999, Li et al.

* cited by examiner

US 6,999,466 B2

SWITCHING CONCENTRATOR

CROSS-REFERENCE TO RELATED APPLICATION

This application is a non-provisional application of provisional application Ser. No. 60/212,333 filed Jun. 16, 2000.

BACKGROUND OF THE DISCLOSURE

1. Field of the Invention

This invention relates to switching circuitry and, more particularly, to an m-to-n concentrator constructed from smaller concentrator/sorters or sorters.

2. Description of the Background Art

A switch with an array of m input ports and an array of n output ports is said to be a switch of "size" m×n. One convention linearly labels the m input ports and the n output ports with, respectively, m and n distinct addresses. Usually, the addresses start from 0, so that the m input ports and n output ports are linearly labeled as 0, 1, . . . , m−1 and 0, 1, . . . , n−1, respectively (in a top-down manner if one visualizes a graphical representation of the input and output ports of the switch in a planar view). This inventive subject matter pertains to m×m switches and, particularly, to a special type of switch designated a "concentrator".

An m×m "sorter" is an m×m switch that compares the values of the m input signals and routes the m input signals to the m output ports such that the values of the m signals are monotonically increasing with respect to the output addresses. A number of signals are said to be monotonically increasing with respect to the output addresses if the value of the signal routed to any particular output address is always not less than that of any other signal routed to a smaller output address. Similarly, a number of signals are said to be monotonically decreasing with respect to the output addresses if the value of the signal routed to any particular output address is always not less than that of any other signal routed to a larger output address. Here an input signal may possibly be an idle expression that is artificially generated at an input port when there is no real data input signal arriving at that input port. As per the graph representation, since the m output ports of an m×m switch are by default labeled from 0 to m−1 in the top-down manner, for a default m×m sorter, any signal routed to a lower output port cannot be less than those routed to upper output ports. Thus signal values on the output side are linearly sorted. For example, FIG. 1 shows a 6×6 sorter 100 as described above. The six input signals 101 assume different integer values and are linearly sorted on the output side 102 of the sorter according to their values.

In a wider sense, an m×m sorter can still be regarded as an m×m sorter even if the ordering of output ports is rotated, flipped, and/or even otherwise permuted in a predetermined fashion, as long as it observes the principle qualification of a sorter that the value of the signal routed to any particular output address is not less than that of any other signals routed to smaller output addresses. For example, FIG. 2 shows a 6×6 wide-sense sorter 200 which sorts the six input signals 201 into a rotation of an increasing sequence 202. For simplicity, and without loss of generality, the sorters appearing in the sequel are of the default type as the one shown in FIG. 1 unless otherwise specified.

A 2×2 sorter is conventionally called a "sorting cell". A default sorting cell always routes the larger one of its two local input signals to its lower output port. All sorting cells appearing hereafter are of the default version unless otherwise specified.

For n<m, an "m-to-n concentrator" is an m×m switch that routes the largest n among the m input signals to the n output ports with the n largest output addresses and the smallest m−n among the m input signals to the m−n output ports with the m−n smallest output addresses. Thus the m output ports can be thought of being partitioned into a "1-output group" and a "0-output group", with the former comprising the n output ports with the n largest addresses and the latter comprising the remaining m−n output ports. Then, an m-to-n concentrator can be regarded as a device which is capable of partitioning the m input signals (including real data input signals and artificial idle expressions) into two groups: the group of n largest signals, which are routed to the 1-output group, and the group of m−n smallest signals, which are routed to the 0-output group. As per the graph representation, by default the m-to-n concentrator is the one wherein the upper m−n output ports form the 0-output group and the lower n output ports form the 1-output group. FIG. 3A shows a 6-to-2 concentrator 300. The two signals of largest values 303 are routed to the 1-output group 301, the group of the lower two output ports, wherein the order between these two signals is arbitrary. Meanwhile, the four signals of smaller values 304 are routed to the 0-output group 302, the group of the upper four output ports, within which the order among the signals is also arbitrary. Similar to the case of sorters, the definition of an m-to-n concentrator in a wider sense allows the rotation, flipping, and/or any other permutations, of the ordering of output ports. Anyway, for any m-to-n concentrator, the 0-output group always comprises the m−n output ports with the smallest m−n output addresses while the 1-output group comprises the n output ports with the largest n output addresses. The only difference between the default and the wide-sense versions lies on the labeling of the m output addresses. For a default m-to-n concentrator, the m output ports are labeled from 0 to m−1 from top to bottom such that the 0-output group always comprises the upper m−n output ports and the 1-output group the lower n output ports. On the other hand, for a wide-sense m-to-n concentrator, the labeling of the m output ports, which is also from 0 to m−1, can be in any predetermined fashion, so the 0-output group can comprise any m−n distinct output ports and the 1-output group the remaining n output ports. FIG. 4 shows an example of a 6-to-2 concentrator 400 in such a wide sense wherein the six output ports are labeled as 0, 1, . . . , 5 from bottom to top such that the two signals of largest values 403 are routed to the 1-output group 401, which is now comprising the upper two output ports.

In some references in the background art, there is notion of an "m×n concentrator", which means an m×n switch, n<m, such that the largest n input signals are routed the n output ports. Thus an m-to-n concentrator can be reduced to an "m×n concentrator" by not implementing output ports in the 0-output group. FIG. 3B shows a 6×2 concentrator 310 by which only the two largest signals are routed to the two output ports 311. As stated above, this 6×2 concentrator may result from the 6-to-2 concentrator 300 in FIG. 3A with the upper four output ports 302 not implemented.

In order to avoid terminology ambiguity, the notion of an "m×n concentrator" will not be adopted. Every concentrator in this context refers to an m-to-n concentrator for some m and some n, n<m.

For any n<m, by letting the lower n outputs of an m×m sorter form the 1-output group and the upper m−n outputs form the 0-output group, the m×m sorter automatically qualifies as an m-to-n concentrator. One way to view the difference between an m×m sorter and a generic m-to-n concentrator is that the former provides a linear ranking among the n signals in the 1-output group and also a linear ranking among the m−n signals in the 0-output group.

For $n \leq m$, an "m-to-n concentrator/sorter" is an m×m switch that routes the smallest m−n among input signals to the m−n smallest output addresses, which form the 0-output group, and the largest n among input signals to the n largest output addresses, which form the 1-output group, such that the values of these n signals are nondecreasing with respect to output addresses. In other words, an m-to-n concentrator/sorter not only is an m-to-n concentrator but also routes signals in a way such that the n signals reaching the 1-output group are sorted; the m−n signals reaching the 0-output group, however, are not necessarily sorted. FIG. 5 shows a (default) 6-to-3 concentrator/sorter 500 as an example wherein the three signals 501 of largest values are grouped together at the bottom and are also linearly sorted while the remaining smaller ones 502 are grouped at the top without sorting. Like the sorter and the concentrator, the concentrator/sorter also has the wide-sense version, but the concentrator/sorters appeared in the context are of the default version unless otherwise specified.

For any $n \leq m$, by letting the lower n outputs of an m×m sorter form the 1-output group and the upper m−n outputs form the 0-output group, the m×m sorter automatically qualifies as an m-to-n concentrator/sorter. Thus an m×m sorter is a special case of an m-to-n concentrator/sorter for all $n \leq m$.

Note that the comparison performed in a sorter, a concentrator, or a concentrator/sorter is based on the order defined over all of the possible values of an input signal, thus a sorter, a concentrator, or a concentrator/sorter should always be associated with an order. This order may vary from application to application and can even be any artificial one. For example, in certain applications of packet switching, the legitimate values of an input signal to a concentrator are "00", "10", and "11", and the concentrator is associated with an artificial order "10"<"00"<"11" which looks awkward but is practically very useful.

An m-to-n concentrator associated with a particular order among all possible values of an input signal automatically becomes an m-to-(m−n) concentrator associated with the reverse of that order if the output ports of the m-to-n concentrator are re-labeled such that the n output ports in the 1-output group of the m-to-n concentrator, that is, the n output ports with the n largest addresses, are now labeled with the n smallest addresses and thus form the new 0-output group of the m-to-(m−n) concentrator, and similarly the 0-output group of the m-to-n concentrator now becomes the new 1-output group of the m-to-(m−n) concentrator. For example, consider FIG. 3A again. The 6-to-2 concentrator 300 associated with the natural order is equivalent to a 6-to-4 concentrator associated with the reversed natural order, that is, "0">"1">"2"> . . . , when the output addresses are re-labeled in the reversed order. The same argument applies to the m-to-n concentrator/sorter.

In background art references, sorters, concentrators, concentrator/sorters, and other switching devices with sorting capabilities are collectively referred to as sorting devices. They can be constructed by various types of architectures, such as crossbar, shared-buffer memory, and multi-stage interconnection network of sorting cells. A multi-stage interconnection network means a collection of interconnected nodes, where the nodes are grouped into a number of stages such that every interconnection line is between two nodes on adjacent stages. Some architectures involve centralized control, which requires high processing and memory speeds and hence is suitable for implementing devices with small number of I/Os but inevitably imposes a bottleneck on the performance when the number of I/Os becomes large. Architectures in the type of multi-stage interconnection network of sorting cells can avoid the centralized control as follows. Every data unit includes an "in-band control signal" followed by a payload. When two data units respectively enter the two input ports of a sorting cell in the multi-stage interconnection network, the "in-band control signals" of the two data units are used as the "input signals to the sorting cell" for comparison. Note that this means the switching decision of the sorting cell is purely determined by just the two "in-band control signals" of two data units and is independent of all other concurrent data units in the multi-stage interconnection network regardless the scale of the network. In this sense, the in-band control of a multi-stage network of sorting cells is extremely distributed.

When a data unit is routed through a multi-stage interconnection network, it may traverse a sorting cell on every stage of the network and its "in-band control signal" is preserved throughout. Since the switching control at all sorting cells on its route is by the simple comparison of the value of its "in-band control signal" against another value, it appears as if the routing of each individual signal through the network is guided by the value of the signal itself. This distributed control mechanism is sometimes referred to as "self-routing" in the literature. Self-routing control over a multi-stage interconnection network of sorting cells enables the construction of large-scale switching devices.

There exist many ways to construct an m-to-n concentrator/sorter. Algorithms for the construction of an m-to-n concentrator/sorter by multi-stage interconnection of sorting cells include, as representative of the art, the so-called "knockout tournaments" technique as disclosed by Y. S. Yeh, M. G. Hluchyj, and A. S. Acampora, "The Knockout Switch: A Simple Modular Architecture for High Performance Packet Switching," IEEE J. Select. Areas Commun., vol. 5, pp. 1274–1283, 1987.

In a reference entitled "Concentrators in ATM switching," Comp. Sys. Sci. Eng., vol. 6, pp. 335–342, 1996, authored in S. -Y. R. Li and C. -M. Lau (Li-Lau), the authors devised and discussed a special m-to-n concentrator, where m=2n, as constructed from two n×n sorters and n sorting cells.

There are no teachings or suggestions of, and thus the art is devoid of, how to generalize the subject matter of the references, and especially of Li-Lau, to handle the construction of an m-to-n concentrator from two concentrator/sorters or sorters and n sorting cells where m is not necessarily equal to 2n.

SUMMARY OF THE INVENTION

Certain limitations and other shortcomings and deficiencies are obviated in accordance with the present invention by circuitry, and a concomitant methodology, for implementing an m-to-n concentrator from two concentrator/sorters or two sorters and n sorting cells in the case of m not necessarily equal to 2n.

In accordance with one broad system aspect of the present invention, an m×m switch having m input ports and m output ports, the switch arranged as an m-to-n concentrator, n<m/2, wherein m−n of the m output ports are grouped into a 0-output group and the remaining n output ports are grouped into a 1-output group, with the concentrator being composed of: (a) an $\lfloor m/2 \rfloor$-to-n first concentrator/sorter wherein n of the $\lfloor m/2 \rfloor$ output ports are grouped into a 1-output group (where $\lfloor \cdot \rfloor$ is the conventional notation for "floor"); (b) an $\lceil m/2 \rceil$-to-n second concentrator/sorter wherein n of the $\lceil m/2 \rceil$ output ports are grouped into a 1-output group (where $\lceil \cdot \rceil$ is the conventional notation for "ceiling"); and (c) n sorting cells wherein each of the sorting cells has a first input port connected to a specific one of the output ports of the 1-output group of the first concentrator/sorter and a second input port connected to a specific one of the output ports of the 1-output group of the second concentrator/sorter and wherein the n lower output ports of the sorting cells form the 1-output group for the concentrator.

In accordance with one method system aspect of the present invention, a method for concentrating the n largest of m incoming signals, n<m/2, includes: (a) processing $\lfloor m/2 \rfloor$ of the incoming signals with an $\lfloor m/2 \rfloor$-to-n concentrator/sorter to produce a first set of comparison signals ordered in increasing order from 1 to n; (b) processing the remaining $\lceil m/2 \rceil$ of the incoming signals with an $\lceil m/2 \rceil$-to-n concentrator/sorter to produce a second set of comparison signals ordered in decreasing order from 1 to n; and (c) selecting the larger between the k-th signal in the first set and the k-th signal of the second set, for each k=1, 2, ..., n, as one of the n largest input signals.

As noted in the above, an m×m sorter is a special case of an m-to-n concentrator/sorter for all n≦m. Thus the $\lfloor m/2 \rfloor$-to-n first concentrator/sorter in accordance with the present invention may be replaced by an $\lfloor m/2 \rfloor \times \lfloor m/2 \rfloor$ sorter. Similarly, the $\lceil m/2 \rceil$-to-n second concentrator/sorter may be replaced by an $\lceil m/2 \rceil \times \lceil m/2 \rceil$ sorter. It is however worthwhile to note that, although an m-to-n concentrator can be constructed from two sorters and n sorting cells, normally a sorter is more complex than a concentrator/sorter, so using concentrator/sorters as the building blocks as disclosed and claimed is generally more advantageous than using sorters.

Moreover, the inventive subject matter is independent of the construction algorithm for the two concentrator/sorters. In the special case when the two concentrator/sorters are constructed from multi-stage interconnection networks of sorting cells, the n sorting cells in the construction of a concentrator then naturally form an additional stage so that the whole concentrator is also a multi-stage interconnection network of sorting cells and thereby naturally suitable for the switching control in the self-routing fashion.

DESCRIPTIONS OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Consider the following examples to elucidate the teachings and suggestions of the present invention.

EXAMPLE 1

Figure 1:
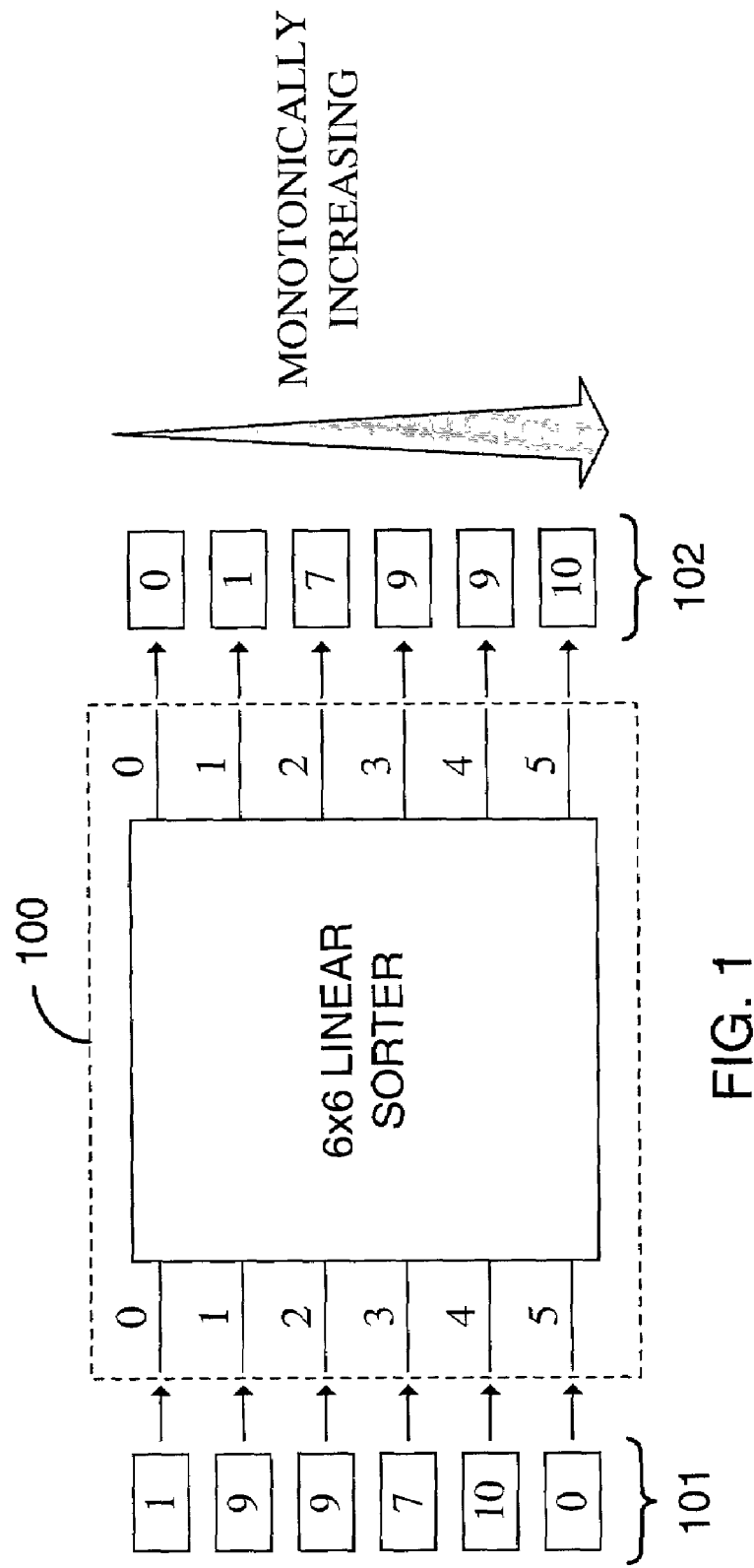
FIG. 1 shows an example of m×m sorter.
Figure 2:
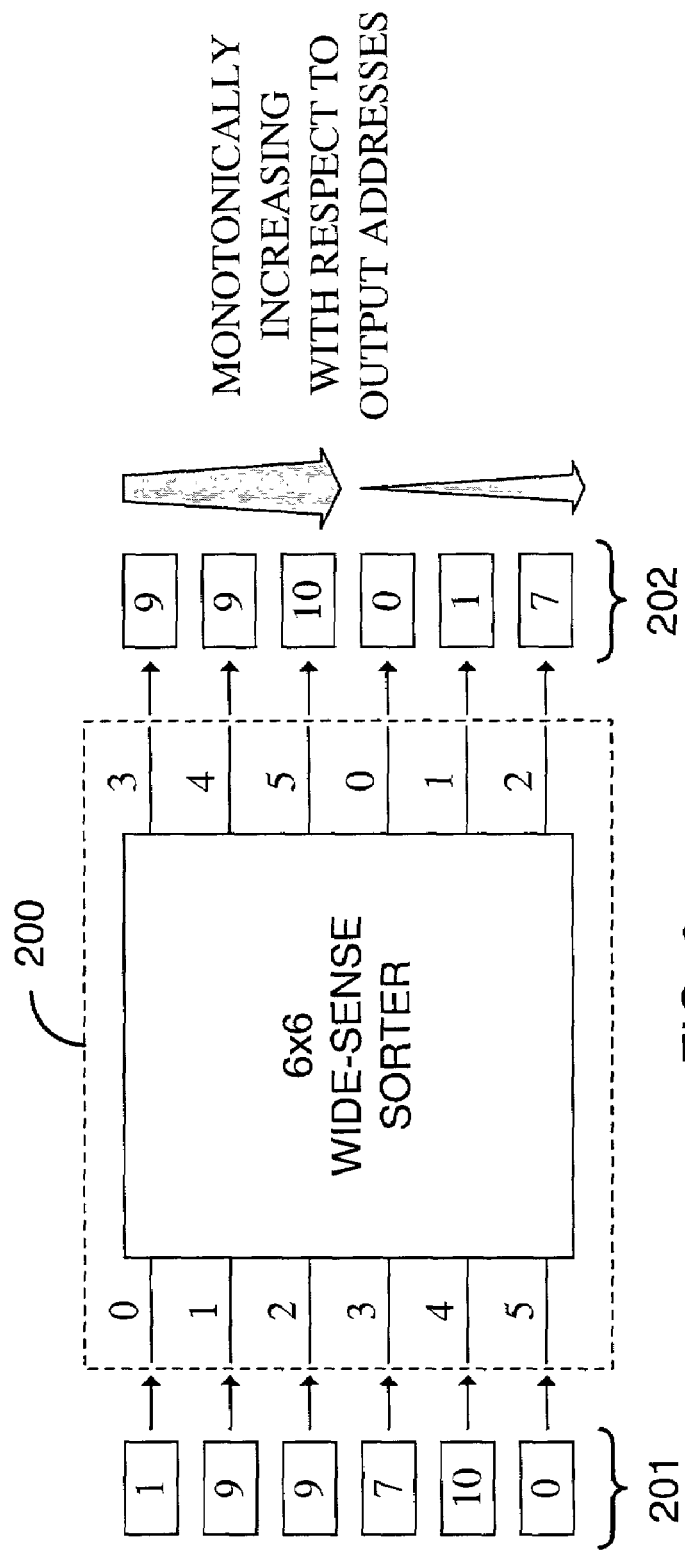
FIG. 2 shows an example of m×m wide-sense sorter.
Figure 3A:
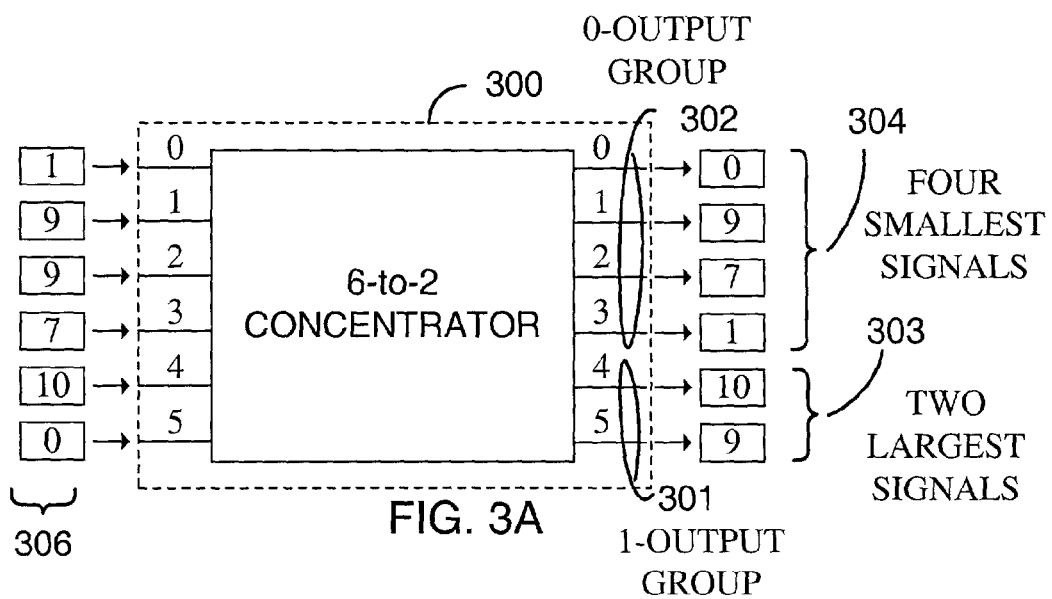
FIG. 3A shows an example of m-to-n concentrator.
Figure 3B:
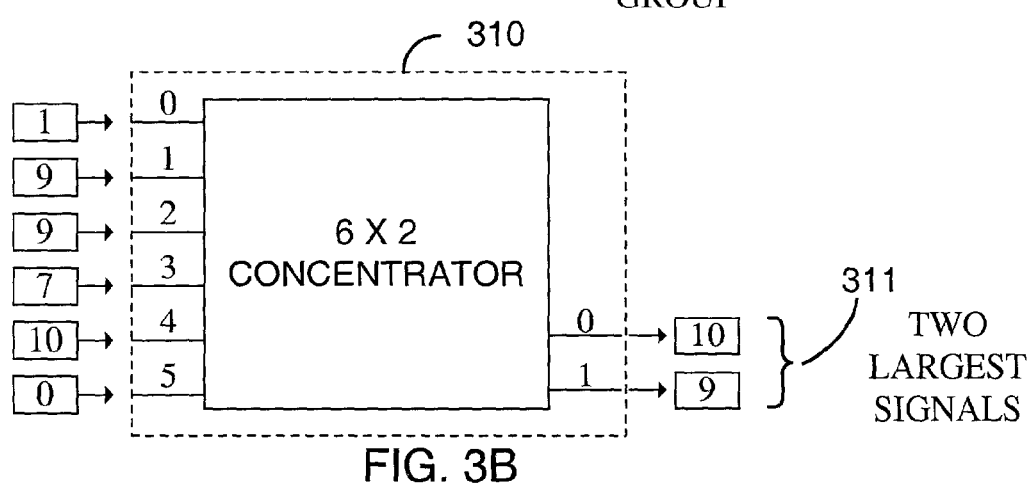
FIG. 3B shows an example of m×n concentrator.
Figure 4:
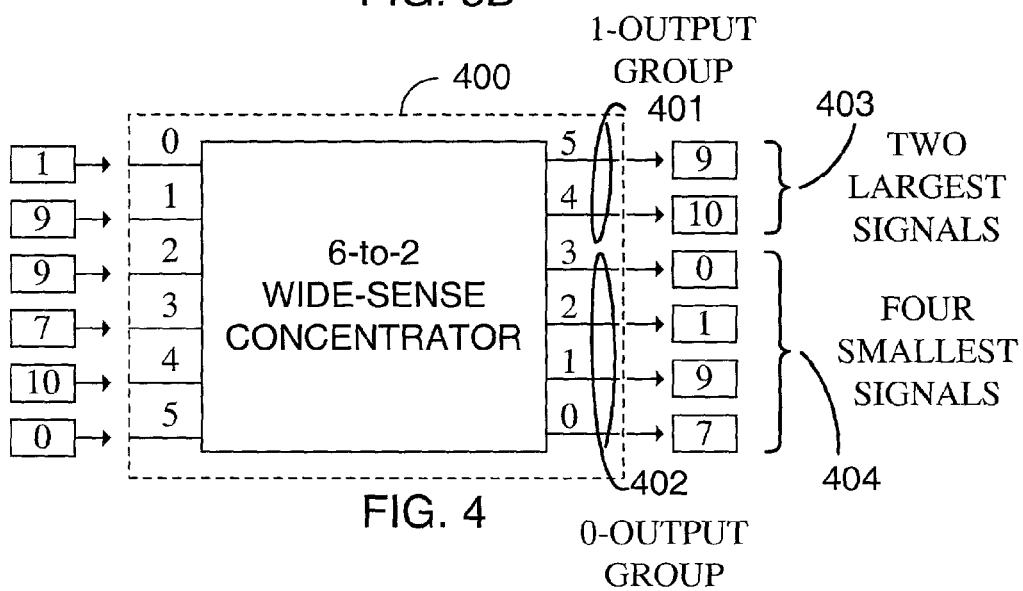
FIG. 4 shows an example of a wide-sense version of an m-to-n concentrator.
Figure 5:
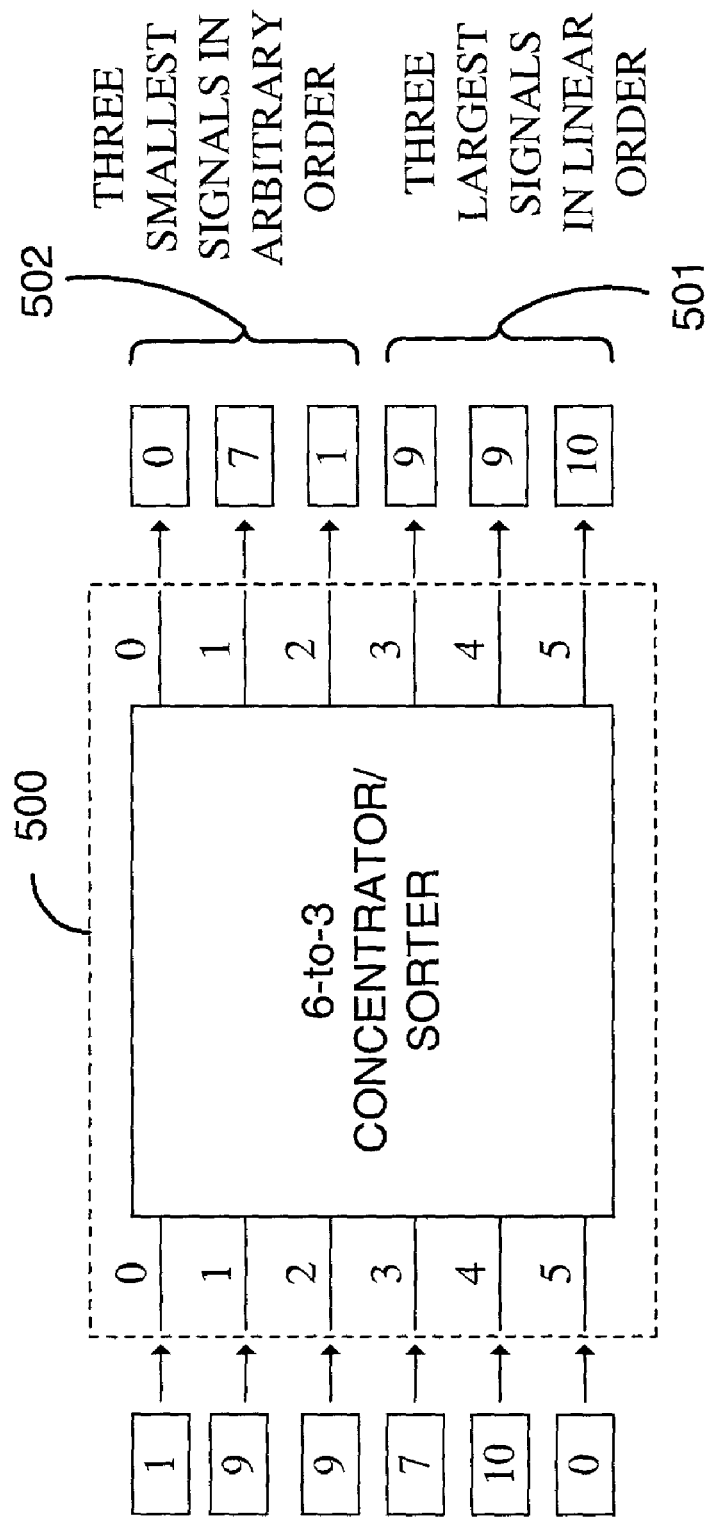
FIG. 5 shows an example of m-to-n concentrator/sorter.
Figure 6:
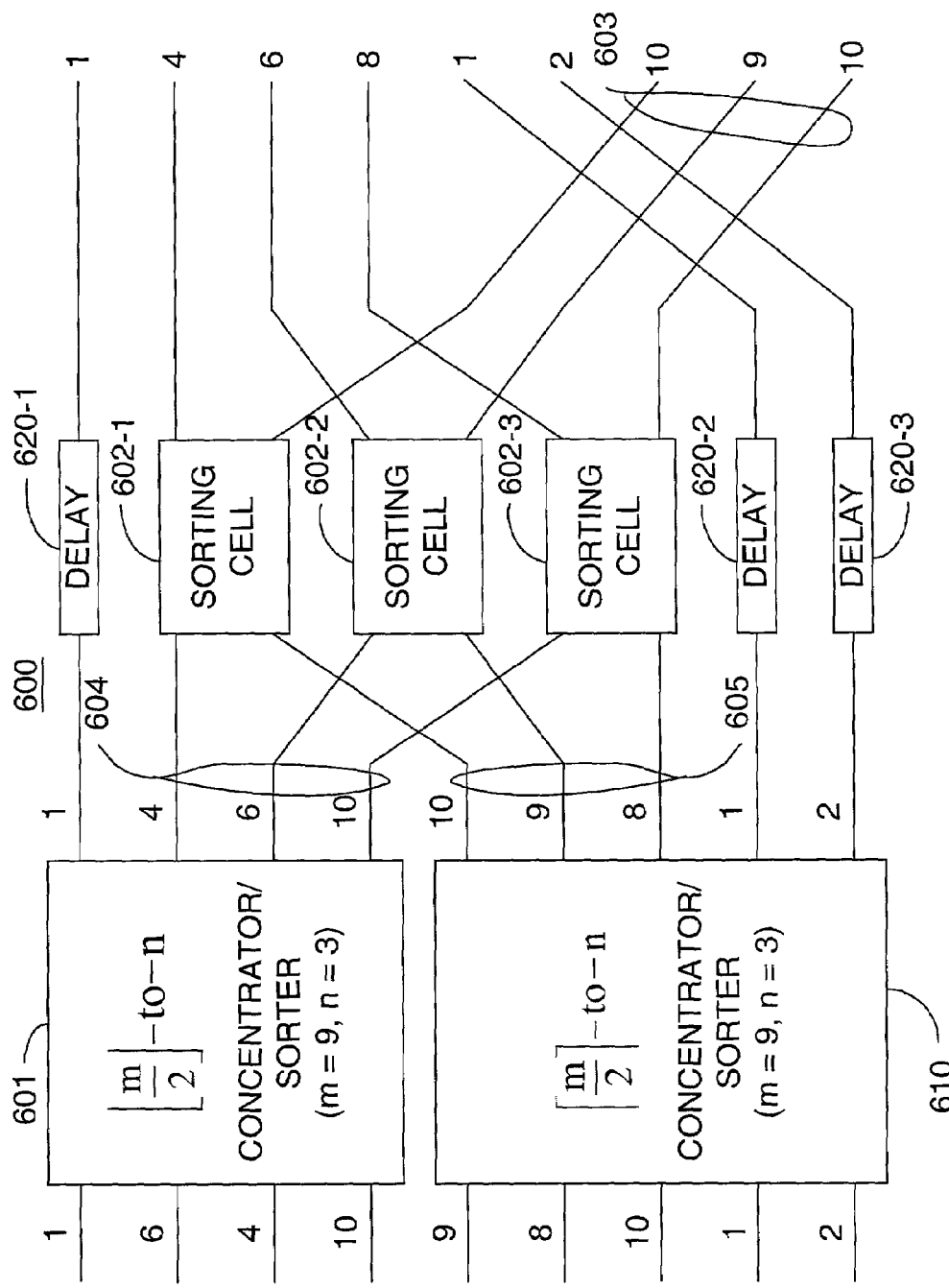
FIG. 6 illustrates an example of a concentrator in accordance with the present invention for the case of two concentrator/sorters.

With reference to FIG. 6, there is shown concentrator 600 for the case of m=9 and n=3, wherein concentrator 600 is composed of: (a) $\lfloor m/2 \rfloor$-to-n concentrator/sorter 601; (b) $\lceil m/2 \rceil$-to-n concentrator/sorter 610; and (c) n sorting cells 602-1, 602-2, and 602-3 interconnected to elements 601 and 610 in the following manner. Each of the sorting cells receives one signal from concentrator/sorter 601 and one signal from concentrator/sorter 610 in such a way that: sorting cell 602-1 compares the largest signal from the 1-output group 604 of element 610 with the smallest signal the 1-output group 605 of element 601 and routes the larger one to the 1-output group of the concentrator, that is, the group of n output ports 603; sorting cell 602-2 compares the second largest signal from the 1-output group of element 610 with the second smallest signal from the 1-output group of element 601 and also routes the larger one to the group of n output ports 603; and, finally, sorting cell 602-3 compares the third largest signal from the 1-output group of element 610 with the third smallest signal from the 1-output group of element 601 and also routes the larger one to the group of n output ports 603. Note that some 1×1 delay elements, like the elements 620-1, 620-2 and 620-3, are sometimes inserted to ensure the synchronization of the signals. The delay elements are usually not explicitly shown in the graph representation when there is no ambiguity. Consider the specific construction identified in FIG. 6; in particular, 601 is a 4-to-3 concentrator/sorter in the default version while 610 is a 5-to-3 wide-sense concentrator/sorter whose five output ports are linearly addressed as 0, 1, ..., 4 from bottom to top such that the 1-output group comprises the upper three output ports. Four input signals having values 1, 6, 4, and 10 appear in top-down manner as inputs to element 601, and five input signals having values 9, 8, 10, 1, and 2 appear in top-down manner as inputs to element 610. Element 601, by its 4-to-3 concentrator/sorter functionality, produces output signals 1, 4, 6, 10 read from the top to the bottom. Similarly, element 610 produces output signals 10, 9, 8, 1, and 2 in top-down manner. Recall that a concentrator/sorter only linearly orders the n largest output signals, and the other n−m output signals need not be linearly ordered. For element 601, the n=3 largest output signals of 4, 6, and 10 are linearly ordered; for element 610 output signals 10, 9, and 8 are linearly ordered. The smallest two output signals from element 610 are in arbitrary order.

When the largest output signal from the 1-output group of element 610 is compared to the smallest output signal from the 1-output group of element 601, that is, when the signal with the value of "4" is compared to the signal with the value of "10", sorting cell 602-1 produces "4" on its upper lead and "10" on its lower lead which leads to the bottom output port of the 1-output group, that is, the group of n output ports identified by reference numeral 603. Similarly, sorting cell 602-2 produces "9" at the next-to-bottom output port of group 603, and sorting cell 602-3 produces "10" at the remaining output port of group 603. Notice that the three signals at the output ports of group 603 are the largest three among the input signals, but are not ordered as per the functionality of a concentrator.

Accordingly, the 1-output group of the concentrator includes the lower output port of each of the n sorting cells, while the 0-output group of the concentrator includes the upper output port of each of the n sorting cells plus the $\lfloor m/2 \rfloor$-n output ports of the 0-output group of the first concentrator/sorter and the $\lceil m/2 \rceil$-n output ports of the 0-output group of the second concentrator/sorter.

EXAMPLE 2

Figure 7:
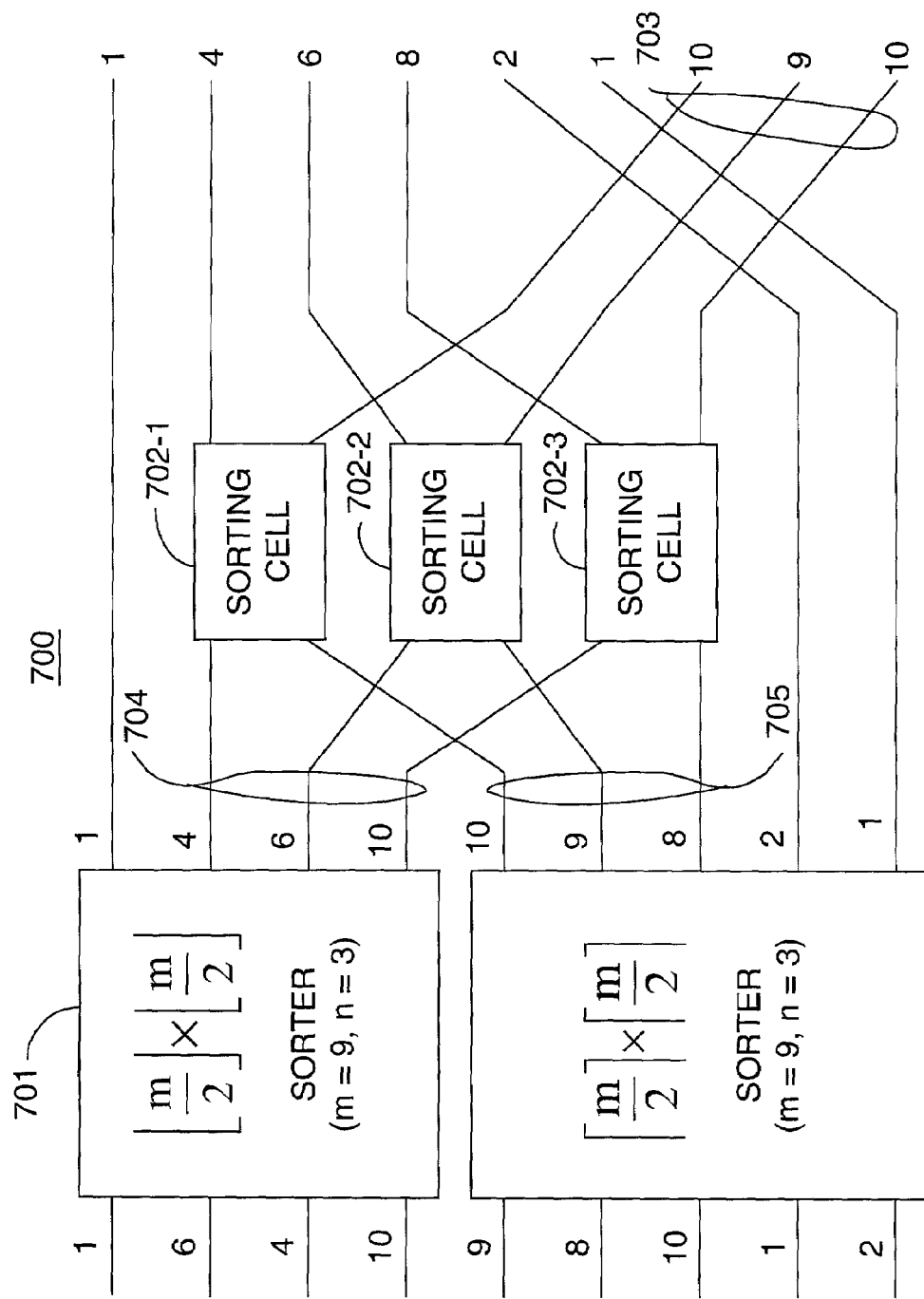
FIG. 7 illustrates an example of a concentrator in accordance with the present invention for the case of two sorters.

With reference to FIG. 7, there is shown concentrator 700 for the case of m=9 and n=3, wherein concentrator 700 is composed of: (a) $\lfloor m/2 \rfloor \times \lfloor m/2 \rfloor$ sorter 701; (b) $\lceil m/2 \rceil \times \lceil m/2 \rceil$ sorter 710; and (c) n sorting cells 702-1, 702-2, and 702-3 interconnected to elements 701 and 710 in the following manner. Each of the sorting cells receives one signal from sorter 701 and one signal from sorter 710 in such a way that: sorting cell 702-1 compares the largest signal from element 710 with the $n^{th}$ largest signal, or equivalently, the smallest signal out of the n largest signals, from element 701 and routes the larger one to the 1-output group of the concentrator, that is, the group of n output ports 703; sorting cell 702-2 compares the second largest signal from element 710 with the $(n-1)^{th}$ largest signal, or equivalently, the second smallest signal out of the n largest signals, from element 701 and also routes the larger one to the group of n output ports 703; and, finally, sorting cell 702-3 compares the third largest signal from element 710 with the third smallest signal out of the n largest signals, that is, the largest signal from element 701 and also routes the larger one to the group of n output ports 703. Consider the specific construction identified in FIG. 7; in particular, 701 is a 4×4 sorter in the default version while 710 is a 5×5 wide-sense sorter whose five output ports are linearly addressed as 0, 1, . . . , 4 from bottom to top. Four input signals having values 1, 6, 4, and 10 appear in top-down manner as inputs to element 701, and five input signals having values 9, 8, 10, 1, and 2 appear in top-down manner as inputs to element 710. Element 701, by its sorter functionality, produces output signals 1, 4, 6, 10 read from the top to the bottom. Similarly, element 710 produces output signals 10, 9, 8, 1, and 2 in top-down manner. Recall that a sorter produces linearly ordered output signals, which is readily apparent from the output signals of both elements 701 and 710. For element 701, the n=3 largest output signals are 4, 6, and 10; for element 710 the three largest output signals are 10, 9, and 8.

When the largest output signal from element 710 is compared to the smallest output signal from element 701, that is, when the signal with the value of "4" is compared to the signal with the value of "10", sorting cell 702-1 produces "4" on its upper lead and "10" on its lower lead which leads to the bottom output port of the 1-output group, that is, the group of n output ports identified by reference numeral 703. Similarly, sorting cell 702-2 produces "9" at the next-to-bottom output port of group 703, and sorting cell 702-3 produces "10" at the remaining output port of group 703. Notice that the three signals at the output ports of group 703 are the largest three of the input signals, but are not ordered as per the functionality of a concentrator.

Generic Implementation Using Two Concentrator/Sorters

As noted in the above, an m-to-n concentrator associated with a particular order among all possible values of an input signal is automatically an m-to-(m−n) concentrator associated with the reverse of that order, although the m-to-(m−n) concentrator is now in the wide sense with its output addresses re-labeled such that the n output ports forming the 1-output group of the m-to-n concentrator are now labeled with the n smallest addresses and hence form the 0-output group of the m-to-(m−n) concentrator while the 0-output group of the m-to-n concentrator becomes the 1-output group of the m-to-(m−n) concentrator. Thus any methodology for m-to-n concentration can also be employed in m-to-(m−n) concentration. Because of this symmetry, to derive a methodology for m-to-n concentration, one may derive a methodology for m-to-(m−n) concentration instead, or employ an existing methodology already developed for m-to-(m−n) concentration. Since either $n \leq m/2$ or $m-n \leq m/2$ holds, it suffices to consider m-to-n concentration with $n \leq m/2$ hereafter.

Figure 8:
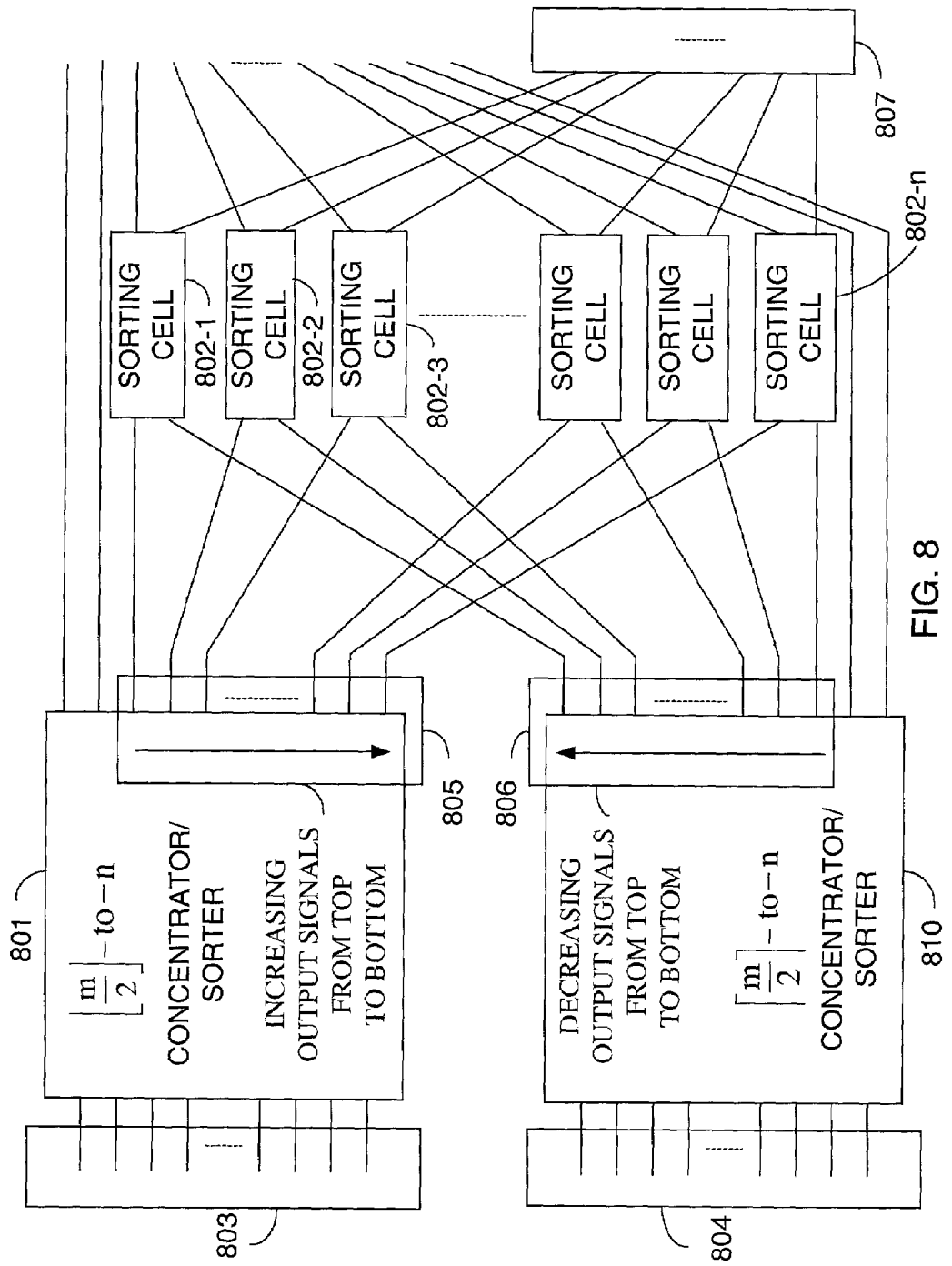
FIG. 8 illustrates the fundamental implementation of the m-to-n concentrator (n<m/2) in accordance with the present invention.

A fundamental implementation of the present invention is depicted in FIG. 8, which is a generalization of FIG. 6. Concentrator 800 includes element 801 which represents an $\lfloor m/2 \rfloor$-to-n concentrator/sorter wherein the n output addresses in its 1-output group increases from top to bottom and thus the n largest signals are linearly sorted into a monotonically increasing sequence from top to bottom (the arrow at the output points towards the largest elements); signal leads shown by reference numeral 803 is thus a group of $\lfloor m/2 \rfloor$ external input signals while the signal leads shown by reference numeral 805 depicts the 1-output group of the concentrator/sorter 801. Similarly, element 810 represents an $\lceil m/2 \rceil$-to-n concentrator/sorter wherein the n output addresses in its 1-output group decreases from top to bottom and thus the n largest signals are linearly sorted into a monotonically decreasing sequence from top to bottom (the arrow at the output points towards the largest elements); reference numeral 804 refers to a group of $\lceil m/2 \rceil$ external input signals while reference numeral 806 refers to the 1-output group of the concentrator/sorter 810. (Alternatively, as is readily appreciated from Example 2 and FIG. 7, element 801 may stand for an $\lfloor m/2 \rfloor \times \lfloor m/2 \rfloor$ sorter and element 810 an $\lceil m/2 \rceil \times \lceil m/2 \rceil$ sorter with their output lists respectively ordered to achieve the same outputs previously described.) Each of the elements denoted by reference numerals 802-1, 802-2, . . . , 802-n is a sorting cell, i.e. the larger of the two input signals is routed to the lower output port and the smaller to the upper output port. There are n parallel sorting cells 802. Each of these sorting cells receives one signal from the group 805 and one from the group 806 in such a way that one of the sorting cells 802-1 compares the largest signal from 806 with the smallest signal from 805 and routes the larger one to the 1-output group 807 of the m-to-n concentrator, another one (802-2) compares the second largest signal from 806 with the second smallest signal from 805 and also route the larger one to the group 807, and so on. This generates as the 1-output group 807 the n largest signals among the 2n signals in groups 805 and 806 altogether, which also are the largest n signals of the m signals in groups 803 and 804 altogether. This completes the desired concentration action.

To be more concise, if the n output signals in the 1-output group 805 of first concentrator/sorter 801 are ordered from 1 to n in association with increasing signal values and the n output signals in the 1-output group 806 of second concentrator/sorter 810 are ordered from 1 to n in association with decreasing signal values, then n sorting cells 802-1, . . . , 802-n are interconnected with the two concentrator/sorters such that the k-th output signal in the 1-output group of first concentrator/sorter 801 and the k-th output signal in the 1-output group of second concentrator/sorter 810 serve as the input signals to the k-th sorting cell (that is, sorting cell 802-k) for k=1, 2, ..., n.

It is noted that in FIG. 8, element 801 can be $\lfloor m/2 \rfloor \times \lfloor m/2 \rfloor$ and element 810 can be $\lceil m/2 \rceil \times \lceil m/2 \rceil$, which two combine to give a group of m inputs and a group of m outputs.

Element 801 can, of course, also be $\lceil m/2 \rceil \times \lceil m/1 \rceil$ and element 810 be $\lfloor m/2 \rfloor \times \lfloor m/2 \rfloor$.

It is further readily appreciated that the advantage to implementing concentrators as illustrated by the arrangement of FIG. 8 is that smaller building-block components are combined to realize a larger concentrator. In the special case when the two concentrator/sorters are constructed from multi-stage interconnection networks of sorting cells, the concentrator so constructed by the teachings of FIG. 8 is then also a multi-stage interconnection network of sorting cells and thereby naturally suitable for the switching control in the self-routing fashion known in the prior art.

Flow Diagram

Figure 9:
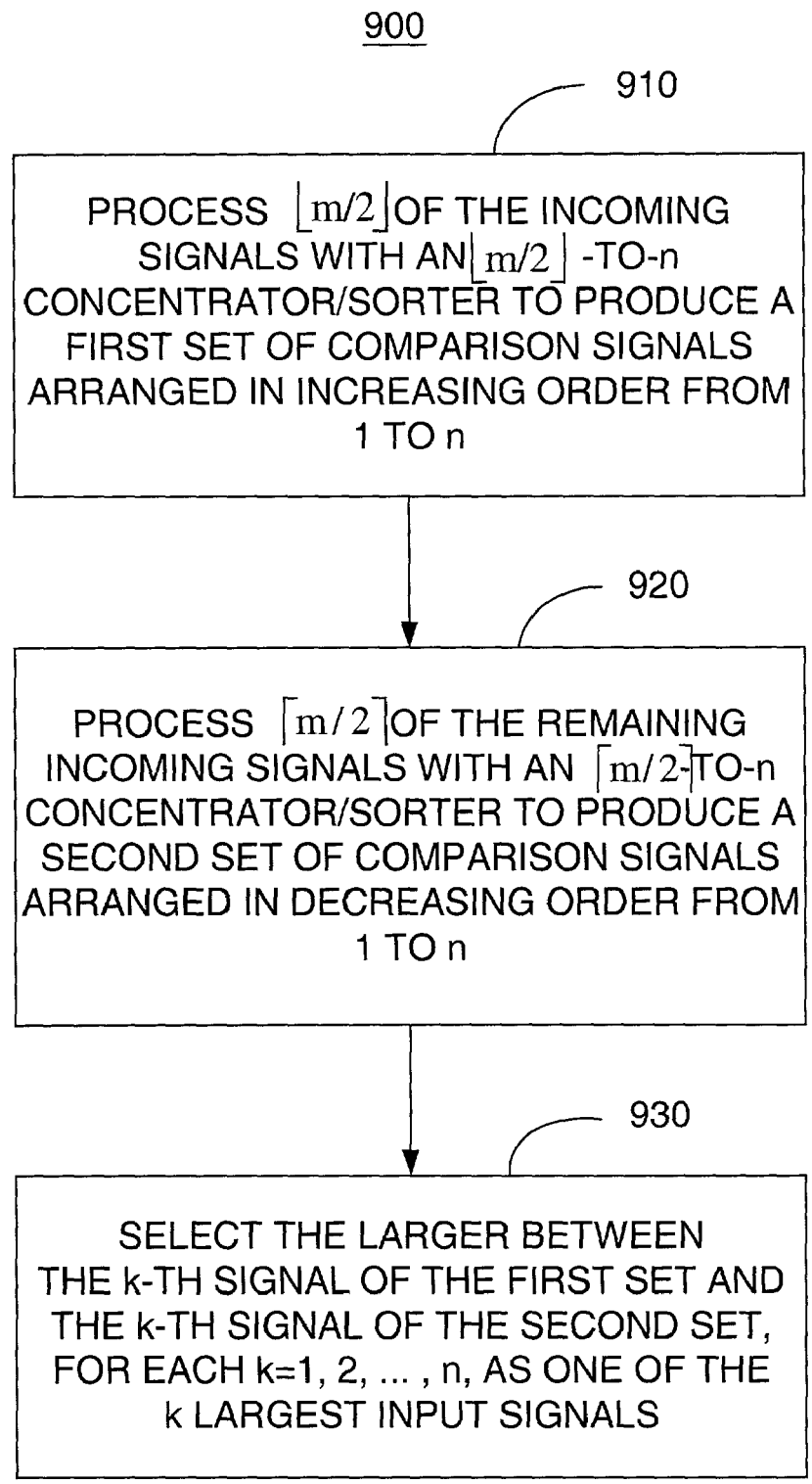
FIG. 9 is a flow diagram in accordance with a method of the present invention.

Flow diagram 900 of FIG. 9 depicts the methodology for m-to-n concentration, n<m/2. Processing block 910 effects the operation of processing $\lfloor m/2 \rfloor$ of the incoming signals with an $\lfloor m/2 \rfloor$-to-n concentrator/sorter to produce a first set of comparison signals ordered in increasing order from 1 to n. In turn, processing block 920 invokes processing of the remaining $\lceil m/2 \rceil$ of the incoming signals with an $\lceil m/2 \rceil$-to-n concentrator/sorter to produce a second set of comparison signals ordered in decreasing order from 1 to n. Finally, processing block 930 is used to select the larger between the k-th signal of the first set and the k-th signal of the second set, for each k=1, 2, ..., n, as one of the n largest input signals.

From another viewpoint, the concentrator as described above, such as in FIG. 8, is an m×m switch that routes m incoming signals in a special manner that achieves m-to-n concentration. The concomitant method underlying such a switch may then be described as a method for routing the n largest of m incoming signals, n<m/2, to n outputs, wherein the method includes: (a) processing $\lfloor m/2 \rfloor$ of the incoming signals with an $\lfloor m/2 \rfloor$-to-n concentrator/sorter to produce a first set of comparison signals ordered in increasing order from 1 to n; (b) processing the remaining $\lceil m/2 \rceil$ of the incoming signals with an $\lceil m/2 \rceil$-to-n concentrator/sorter to produce a second set of comparison signals ordered in decreasing order from 1 to n; and (c) routing the larger between the k-th signal in the first set and the k-th signal of the second set to one of the n outputs, k=1, 2, ..., n.

Multistage Interconnection Network of Sorting Cells

Figure 10:
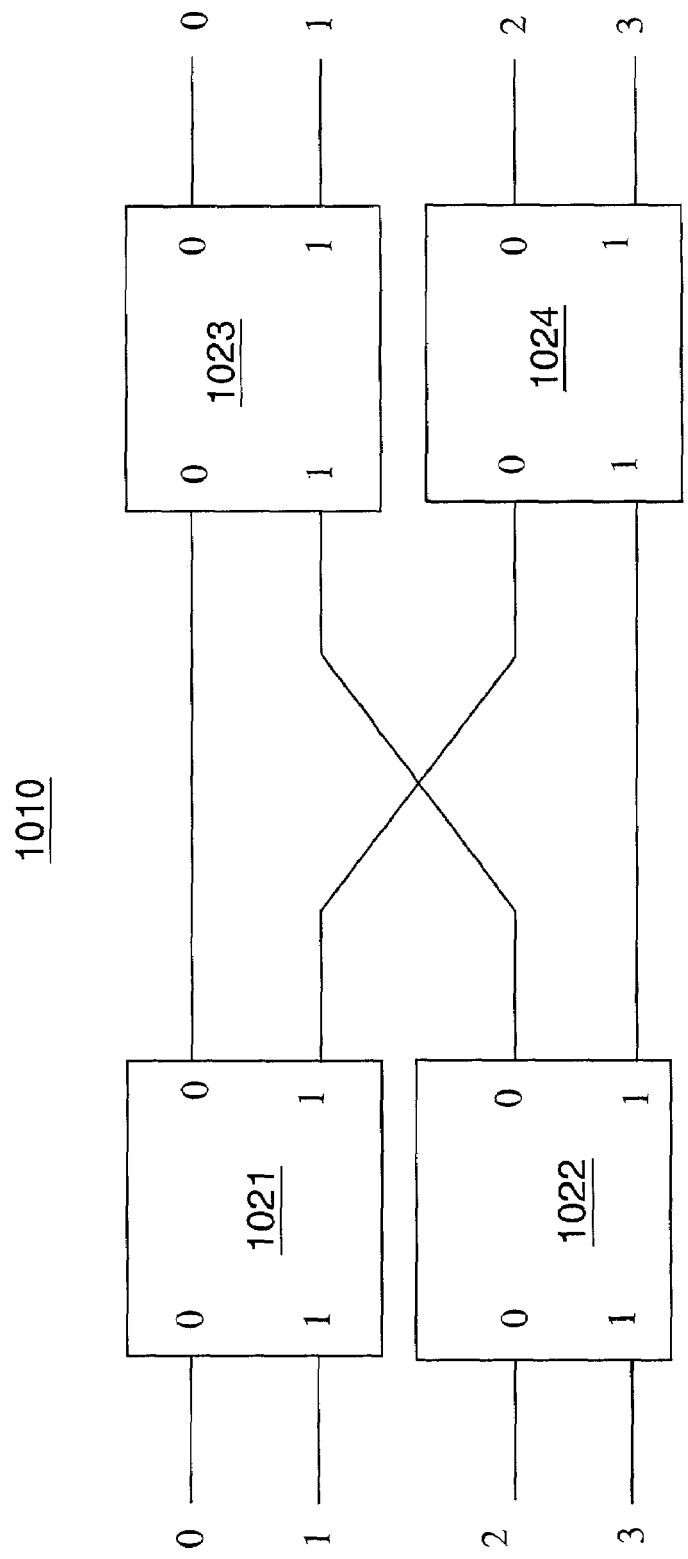
FIG. 10 is an exemplary block diagram of two-stage interconnection of sorting cells.

The block diagram of FIG. 10 shows a two-stage interconnection network of sorting cells which is representative of a generic multi-stage interconnection network of sorting cells. In particular, FIG. 10 depicts a 4×4 2-stage network 1010 wherein each node 1021, 1022, 1023, and 1024 is filled with a sorting cell. The external input addresses (0, 1, 2, 3) are in natural order, and their correspondence with input addresses of input nodes 1021, 1022 is readily discerned. Similarly the external output addresses (0, 1, 2, 3) are in natural order and their correspondence with output addresses of output nodes 1023, 1024 is readily discerned.

Although the present invention has been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements which, although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention.

What is claimed is:

1. An m×m switch having m input ports and m output ports to route m incoming signals, the switch arranged as an m-to-n concentrator, n<m/2, wherein m−n of the m output ports are grouped into a 0-output group while the remaining n output ports are grouped into a 1-output group, and the m incoming signals are compared according to a predetermined order among all possible values of a signal and thus the largest n among the m incoming signals are routed to the 1-output group while the remaining m−n of the m incoming signals are routed to the 0-output group, the concentrator comprising an $\lfloor m/2 \rfloor$-to-n first concentrator/sorter to process $\lfloor m/2 \rfloor$ of the incoming signals wherein n of the $\lfloor m/2 \rfloor$ output ports are grouped into a first 1-output group of the first concentrator/sorter and the largest n among the $\lfloor m/2 \rfloor$ incoming signals are routed to the first 1-output group, an $\lceil m/2 \rceil$-to-n second concentrator/sorter to process the remaining $\lceil m/2 \rceil$ of the incoming signals wherein n of the $\lceil m/2 \rceil$ output ports are grouped into a second 1-output group of the second concentrator/sorter and the largest n among the $\lceil m/2 \rceil$ incoming signals are routed to the second 1-output group, and n sorting cells wherein the k-th one of the sorting cells, k=1, 2, ..., n, has a first input port connected to a specific one of the output ports of the 1-output group of the first concentrator/sorter to receive one signal from the specific output port of the first concentrator/sorter as the first one of the two input signals to the k-th sorting cell and a second input port connected to a specific one of the output ports of the 1-output group of the second concentrator/sorter to receive one signal from the specific output port of the second concentrator/sorter as the second one of the two input signals to the k-th sorting cell and the sorting cell compares the values of its two input signals and routes the one with the larger value to the lower one of its two output ports, and wherein the 1-output group for the m-to-n concentrator comprises the lower output port of all n sorting cells.

2. The concentrator as recited in claim 1 wherein the $\lfloor m/2 \rfloor$-to-n first concentrator/sorter is an $\lfloor m/2 \rfloor \times \lfloor m/2 \rfloor$ sorter and/or the $\lceil m/2 \rceil$-to-n second concentrator/sorter is an $\lceil m/2 \rceil \times \lceil m/2 \rceil$ sorter.

3. The concentrator as recited in claim 1 wherein the first concentrator/sorter and the second concentrator/sorter are connected to the sorting cells as follows: the output port having the largest address among the n output ports of the 1-output group of the second concentrator/sorter and the output port having the smallest address among the n output ports of the 1-output group of the first concentrator/sorter are connected to a first one of the sorting cells; the output port having the next-largest address among the n output ports of the 1-output group of the second concentrator/sorter and the output port having the smallest address among the n output ports of the 1-output group of the first concentrator/sorter are connected to a second one of the sorting cells; with the interconnection pattern continuing in this manner so that, finally, the output port having the smallest address among the n output ports of the 1-output group of the second concentrator/sorter and the output port having the largest address among the n output ports of the 1-output group of the first concentrator/sorter are connected to the n-th one of the sorting cells.

4. The concentrator as recited in claim 1 wherein the n signals routed to the 1-output group of first concentrator/sorter are ordered from 1 to n in association with increasing signal values and the n signals routed to the 1-output group of second concentrator/sorter are ordered from 1 to n in association with decreasing signal values, and wherein the n sorting cells are interconnected with the two concentrator/sorters such that the k-th output signal in the 1-output group of first concentrator/sorter and the k-th output signal in the 1-output group of second concentrator/sorter serve as the two input signals to the k-th sorting cell.

5. The concentrator as recited in claim 1 wherein the first concentrator/sorter and the second concentrator/sorter are each constructed from multi-stage interconnection network of sorting cells.

6. The concentrator as recited in claim 1 wherein the 1-output group of the concentrator includes the lower output port of each of the n sorting cells and the 0-output group of the concentrator includes the upper output port of each of the n sorting cells plus the $\lfloor m/2 \rfloor$-n output ports of the 0-output group of the first concentrator/sorter and the $\lceil m/2 \rceil$-n output ports of the 0-output group of the second concentrator/sorter.

7. An m×m switch having m input ports and m output ports, the switch arranged as an m-to-n concentrator, n<m/2, wherein m−n of the m output ports are grouped into a 0-output group and the remaining n output ports are grouped into a 1-output group, the concentrator comprising
  an $\lfloor m/2 \rfloor$-to-n first concentrator/sorter wherein n of the $\lfloor m/2 \rfloor$ output ports are grouped into a 1-output,
  an $\lceil m/2 \rceil$-to-n second concentrator/sorter wherein n of the $\lceil m/2 \rceil$ output ports are grouped into a 1-output group, and
  n sorting cells wherein each of the sorting cells has a first input port connected to a specific one of the output ports of the 1-output group of the first concentrator/sorter and a second input port connected to a specific one of the output ports of the 1-output group of the second concentrator/sorter and wherein the n lower output ports of the sorting cells form the 1-output group for the concentrator.

8. An m×m switch having m input ports and m output ports to route m incoming signals, the switch arranged as an m-to-n concentrator, n<m/2, wherein m−n of the m output ports are grouped into a 0-output group while the remaining n output ports are grouped into a 1-output group, and the m incoming signals are compared according to a predetermined order among all possible values of a signal and thus the largest n among the m incoming signals are routed to the 1-output group while the remaining m−n of the m incoming signals are routed to the 0-output group, the concentrator comprising
  an $\lceil m/2 \rceil$-to-n first concentrator/sorter to process $\lceil m/2 \rceil$ of the incoming signals wherein n of the $\lceil m/2 \rceil$ output ports are grouped into a first 1-output group of the first concentrator/sorter and the largest n among the $\lceil m/2 \rceil$ incoming signals are routed to the first 1-output group,
  an $\lfloor m/2 \rfloor$-to-n second concentrator/sorter to process the remaining $\lfloor m/2 \rfloor$ of the incoming signals wherein n of the $\lfloor m/2 \rfloor$ output ports are grouped into a second 1-output group of the second concentrator/sorter and the largest n among the $\lfloor m/2 \rfloor$ incoming signals are routed to the second 1-output group, and
  n sorting cells wherein the k-th one of the sorting cells, k=1, 2, . . . , n, has a first input port connected to a specific one of the output ports of the 1-output group of the first concentrator/sorter to receive one signal from the specific output port of the first concentrator/sorter as the first one of the two input signals to the k-th sorting cell and a second input port connected to a specific one of the output ports of the 1-output group of the second concentrator/sorter to receive one signal from the specific output port of the second concentrator/sorter as the second one of the two input signals to the k-th sorting cell and the sorting cell compares the values of its two input signals and routes the one with the larger value to the lower one of its two output ports, and wherein the 1-output group for the m-to-n concentrator comprises the lower output port of all n sorting cells.

9. The concentrator as recited in claim 8 wherein the $\lceil m/2 \rceil$-to-n first concentrator/sorter is an $\lceil m/2 \rceil \times \lceil m/2 \rceil$ sorter and/or the $\lfloor m/2 \rfloor$-to-n second concentrator/sorter is an $\lfloor m/2 \rfloor \times \lfloor m/2 \rfloor$ sorter.

10. The concentrator as recited in claim 8 wherein the first concentrator/sorter and the second concentrator/sorter are connected to the sorting cells as follows: the output port having the largest address among the n output ports of the 1-output group of the second concentrator/sorter and the output port having the smallest address among the n output ports of the 1-output group of the first concentrator/sorter are connected to a first one of the sorting cells; the output port having the next-largest address among the n output ports of the 1-output group of the second concentrator/sorter and the output port having the smallest address among the n output ports of the 1-output group of the first concentrator/sorter are connected to a second one of the sorting cells; with the interconnection pattern continuing in this manner so that, finally, the output port having the smallest address among the n output ports of the 1-output group of the second concentrator/sorter and the output port having the largest address among the n output ports of the 1-output group of the first concentrator/sorter are connected to the n-th one of the sorting cells.

11. The concentrator as recited in claim 8 wherein the n signals routed to the 1-output group of first concentrator/sorter are ordered from 1 to n in association with increasing signal values and the n signals routed to the 1-output group of second concentrator/sorter are ordered from 1 to n in association with decreasing signal values, and wherein the n sorting cells are interconnected with the two concentrator/sorters such that the k-th output signal in the 1-output group of first concentrator/sorter and the k-th output signal in the 1-output group of second concentrator/sorter serve as the two input signals to the k-th sorting cell.

12. The concentrator as recited in claim 8 wherein the first concentrator/sorter and the second concentrator/sorter are each constructed from multi-stage interconnection network of sorting cells.

13. The concentrator as recited in claim 8 wherein the 1-output group of the concentrator includes the lower output port of each of the n sorting cells and the 0-output group of the concentrator includes the upper output port of each of the n sorting cells plus the $\lfloor m/2 \rfloor$-n output ports of the 0-output group of the first concentrator/sorter and the $\lceil m/2 \rceil$-n output ports of the 0-output group of the second concentrator/sorter.

14. An m×m switch having m input ports and m output ports, the switch arranged as an m-to-n concentrator, n<m/2, wherein m−n of the m output ports are grouped into a 0-output group and the remaining n output ports are grouped into a 1-output group, the concentrator comprising
    an $\lceil m/2 \rceil$-to-n first concentrator/sorter wherein n of the $\lceil m/2 \rceil$ output ports are grouped into a 1-output,
    an $\lfloor m/2 \rfloor$-to-n second concentrator/sorter wherein n of the $\lfloor m/2 \rfloor$ output ports are grouped into a 1-output group, and
    n sorting cells wherein each of the sorting cells has a first input port connected to a specific one of the output ports of the 1-output group of the first concentrator/sorter and a second input port connected to a specific one of the output ports of the 1-output group of the second concentrator/sorter and wherein the n lower output ports of the sorting cells form the 1-output group for the concentrator.

15. A method for implementing an m-to-n concentrator, n<m/2, comprising
    configuring an $\lfloor m/2 \rfloor$-to-n first concentrator/sorter having a 1-output group,
    configuring an $\lceil m/2 \rceil$-to-n second concentrator/sorter having a 1-output group, and
    interconnecting the first concentrator/sorter and the second concentrator/sorter with n sorting cells wherein each of the sorting cells has a first input port connected to a specific one of the output ports of the 1-output group of the first concentrator/sorter and a second input port connected to a specific one of the output ports of the 1-output group of the second concentrator/sorter and wherein the n lower output ports of the n sorting cells form the 1-output group for the concentrator.

16. The method as recited in claim 15 wherein configuring the $\lfloor m/2 \rfloor$-to-n first concentrator/sorter includes configuring an $\lfloor m/2 \rfloor \times \lfloor m/2 \rfloor$ first sorter and/or configuring the $\lceil m/2 \rceil$-to-n second concentrator/sorter includes configuring an $\lceil m/2 \rceil \times \lceil m/2 \rceil$ sorter.

17. The method as recited in claim 15 wherein n output signals at the 1-output group of first concentrator/sorter are ordered from 1 to n in association with increasing signal values and n output signals at the 1-output group of second concentrator/sorter are ordered from 1 to n in association with decreasing signal values, and wherein interconnecting the n sorting cells includes interconnecting the two concentrator/sorters such that the k-th output signal in the 1-output group of first concentrator/sorter and the k-th output signal in the 1-output group of second concentrator/sorter serve as the input signals to the k-th sorting cell for k=1, 2, . . . , n.

18. A method for implementing an m-to-n concentrator, n<m/2, comprising
    configuring an $\lceil m/2 \rceil$-to-n first concentrator/sorter having a 1-output group,
    configuring an $\lfloor m/2 \rfloor$-to-n second concentrator/sorter having a 1-output group, and
    interconnecting the first concentrator/sorter and the second concentrator/sorter with n sorting cells wherein each of the sorting cells has a first input port connected to a specific one of the output ports of the 1-output group of the first concentrator/sorter and a second input port connected to a specific one of the output ports of the 1-output group of the second concentrator/sorter and wherein the n lower output ports of the n sorting cells form the 1-output group for the concentrator.

19. The method as recited in claim 18 wherein configuring the $\lceil m/2 \rceil$-to-n first concentrator/sorter includes configuring an $\lceil m/2 \rceil \times \lceil m/2 \rceil$ first sorter and/or configuring the $\lfloor m/2 \rfloor$-to-n second concentrator/sorter includes configuring an $\lfloor m/2 \rfloor \times \lfloor m/2 \rfloor$ sorter.

20. The method as recited in claim 18 wherein n output signals at the 1-output group of first concentrator/sorter are ordered from 1 to n in association with increasing signal values and n output signals at the 1-output group of second concentrator/sorter are ordered from 1 to n in association with decreasing signal values, and wherein interconnecting the n sorting cells includes interconnecting the two concentrator/sorters such that the k-th output signal in the 1-output group of first concentrator/sorter and the k-th output signal in the 1-output group of second concentrator/sorter serve as the input signals to the k-th sorting cell for k=1, 2, . . . , n.

21. The method for m-to-(m−n) concentration, $1 \leq n \leq m/2$, associated with a particular order among all possible values of an input signal by adapting the method recited by any one of claims 15–20 for m−n concentration associated with the reverse of said order.

22. The apparatus for m-to-(m−n) concentration, $1 \leq n \leq m/2$, associated with a particular order among all possible values of an input signal, by adapting the apparatus recited by any one of claims 1–14 for m−n concentration associated with the reverse of said order.

* * * * *